United States Patent [19]

Araki et al.

[11] Patent Number: 5,258,878
[45] Date of Patent: Nov. 2, 1993

[54] ELECTRONIC STILL CAMERA WITH RECORDING DISK AND RECORDING CONTROL

[75] Inventors: Yoshitaka Araki, Tokyo; Yoshio Nara, Kawasaki; Tadashi Ohta, Tokyo; Yasuaki Ishiguro, Ohi, all of Japan

[73] Assignee: Nikon Corporation, Tokyo, Japan

[21] Appl. No.: 444,411

[22] Filed: Dec. 1, 1989

Related U.S. Application Data

[60] Division of Ser. No. 135,538, Dec. 18, 1987, Pat. No. 4,896,226, which is a continuation of Ser. No. 867,007, May 20, 1986, abandoned, which is a continuation of Ser. No. 541,972, Oct. 14, 1983, abandoned.

[30] Foreign Application Priority Data

Oct. 19, 1982 [JP] Japan .................. 57-183086

[51] Int. Cl.$^5$ .................. G11B 19/04; H04N 5/76
[52] U.S. Cl. .................. 360/60; 360/35.1; 360/75; 358/335; 358/321; 358/342; 358/909; 369/50
[58] Field of Search ........... 358/312, 313, 906, 909, 358/342, 335, 321, 322; 360/35.1, 60, 97, 106, 33.1, 73.02, 73.06, 78.04, 78.06, 75, 27, 73.03, 74.4; 354/173.1, 173.11, 205, 219, 224, 226; 369/111, 59, 50

[56] References Cited

U.S. PATENT DOCUMENTS

| | | | |
|---|---|---|---|
| 4,057,830 | 11/1977 | Adcock | 360/35.1 X |
| 4,101,929 | 7/1978 | Ohneda | 358/44 X |
| 4,131,919 | 12/1978 | Lloyd | 360/35.1 X |
| 4,150,410 | 4/1979 | Tsumura | 360/137 X |
| 4,338,009 | 7/1982 | Lee | 354/224 X |
| 4,382,668 | 5/1983 | Umehara et al. | 354/173.1 X |
| 4,423,498 | 12/1983 | Kimura et al. | 360/74.4 |
| 4,482,227 | 11/1984 | Shiozawa | 354/173.11 X |
| 4,512,006 | 4/1985 | Murakami et al. | 369/59 |
| 4,527,205 | 7/1985 | Konishi | 358/906 X |
| 4,530,018 | 7/1985 | Hoshino et al. | 360/73.03 |
| 4,570,188 | 2/1986 | Ichiyanagi | 360/35.1 X |
| 4,896,226 | 1/1990 | Araki et al. | |

FOREIGN PATENT DOCUMENTS

2916387 10/1979 Fed. Rep. of Germany ...... 358/906
52-67302 6/1977 Japan ............................. 369/111

OTHER PUBLICATIONS

"The Electronic Still Camera, A New Concept in Photography", Kihara et al, IEEE Transactions on Consumer Electronics vol. CE-28, No. 3, Aug. 82.

*Primary Examiner*—Aristotelis Psitos
*Assistant Examiner*—Muhammad N. Edun
*Attorney, Agent, or Firm*—Shapiro and Shapiro

[57] ABSTRACT

An electronic still camera an image-forming optical system for forming an image of an object, image pick-up for converting the image into an electrical signal, a first electric motor, a second electric motor, blocking device for allowing and blocking the light forming the image from reaching the image pick-up, the blocking device being driven by the second motor and a rotary member rotated at a uniform speed by the first motor, the rotary member having plural areas in each of which areas one frame amount of the electrical signal corresponding to a still image of the formed image is to be recorded. The camera further comprises recording device for recording the one frame amount of electrical signal in one of the plural areas of the rotary member during rotation, the recording device being moved by the second motor in such manner as to enable the recording device to shift from one to another of the plural areas for recording.

3 Claims, 9 Drawing Sheets

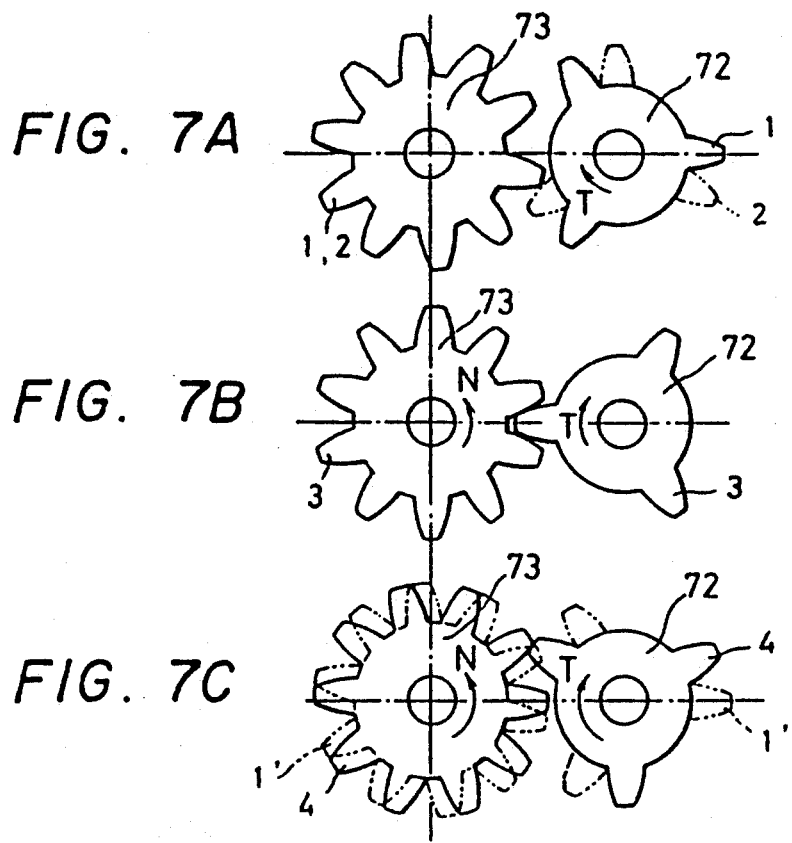
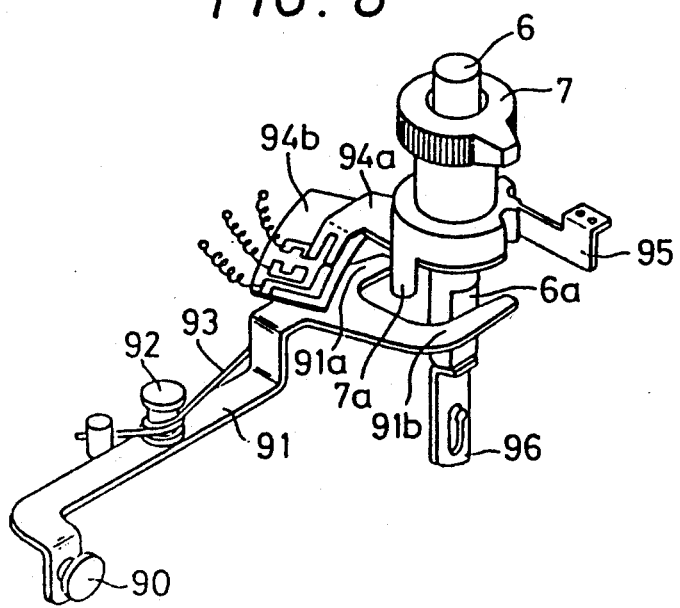

ELECTRONIC STILL CAMERA WITH RECORDING DISK AND RECORDING CONTROL

This is a division of application Ser. No. 135,538 filed Dec. 18, 1987 (now U.S. Pat. No. 4,896,226 issued Jan. 23, 1990); which is a continuation of application Ser. No. 867,007 filed May 20, 1986 (abandoned); which is a continuation of application Ser. No. 541,972 filed Oct. 14, 1983 (abandoned).

BACKGROUND OF THE INVENTION

1. Field of the Invention

The present invention relates to an electronic still camera of the type in which an object image formed by a photographing lens is converted into a video signal by means of image pick-up element and the video signal corresponding to a single frame image, namely still image is recorded on a magnetic recording medium such as a disk-shaped magnetic recording sheet.

2. Description of the Prior Art

The above-mentioned type of electronic still camera is known in the art. However, many of the prior inventions relating to the camera have disclosed only the principle and basic form thereof. There are few inventions directed to any concrete marketable structure. In particular, as to the correlation in operation as well as in arrangement between the driving mechanism of diaphragm, shutter, etc. and the mechanism for moving the magnetic recording head on the record track, no full discussion has been made in the prior inventions.

In this type of electronic camera, the magnetic recording disk is driven into rotation by a motor and the magnetic recording head is stopped for recording. The rotation of the recording disk must be controlled with an extremely high accuracy. The precise control on the mechanism for rotating the magnetic recording disk should not be disturbed by the operations of parts of the camera other than the rotating mechanism. Therefore, the most important problem in this type of electronic camera is to accurately and reliably operate other parts of the camera without any interference between the operations of the other parts and the necessary precise control on the mechanism for rotating the magnetic recording disk.

SUMMARY OF THE INVENTION

Accordingly it is an object of the present invention to solve the above problem and provide an electronic still camera which is small in size and high in reliability.

It is another object of the invention to provide such an electronic camera which is satisfactorily acceptable in the market.

Other and further objects, features and advantages of the present invention will appear more fully from the following description taken in connection with the accompanying drawings.

BRIEF DESCRIPTION OF THE DRAWINGS

FIGS. 7A to 7C are plan views illustrating the operation of the mechanism shown in FIG. 6;

FIG. 8 is a perspective view showing the mechanical relationship between the mode change-over ring and the release button shown in FIG. 5;

FIG. 12 is a circuit diagram showing a concrete form of the circuit 123 shown in FIG. 12.

DESCRIPTION OF PREFERRED EMBODIMENTS

Figure 1A:
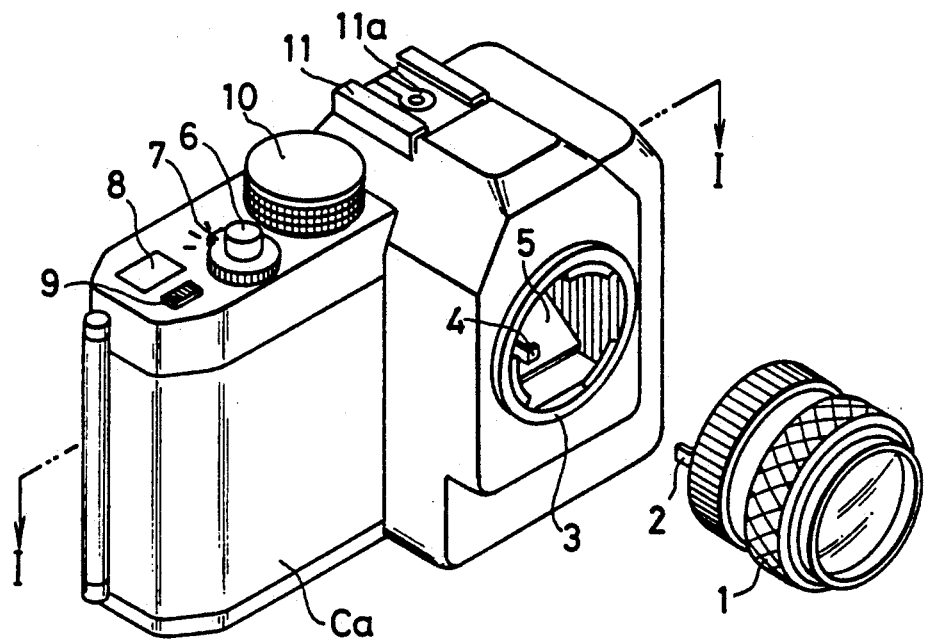
FIG. 1A is a perspective view of a camera body in which the present invention has been embodied.
Figure 1B:
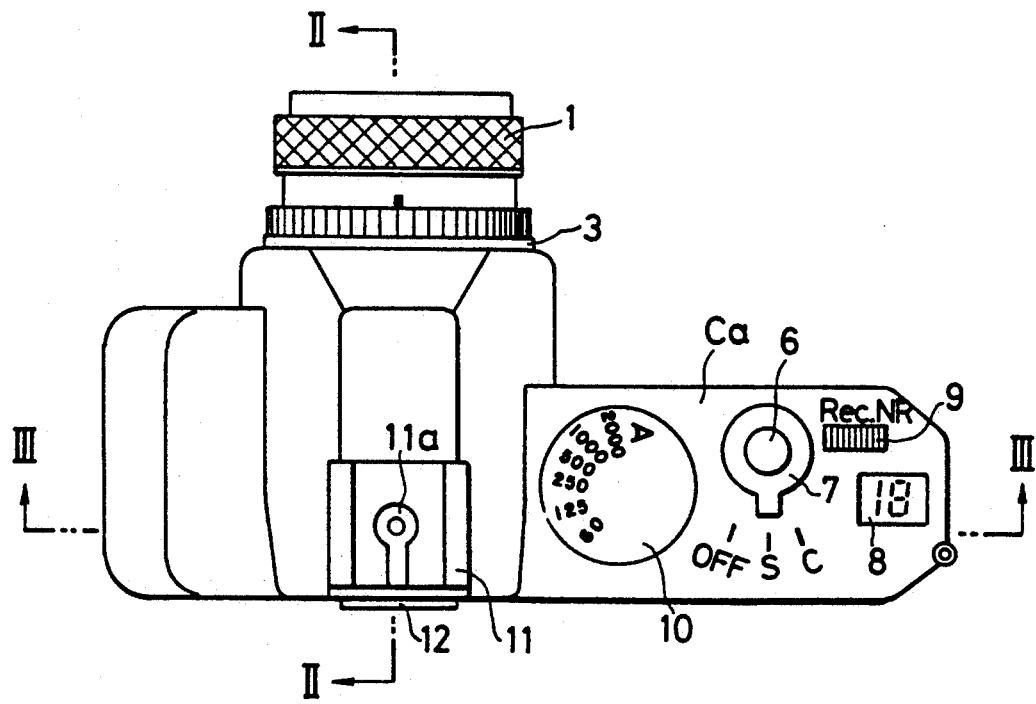
FIG. 1B is a top view thereof.

Referring first to FIGS. 1A and 1B showing an embodiment of the present invention, Ca denotes the main body of an electronic camera which the present invention relates to (hereinafter simply referred to as the camera).

1 is an exchangeable photographing lens provided with distance setting ring, aperture stop adjustment ring and other adjustment members usually required for picture-taking. Designated by 3 is a lens mount so formed as to be engageable with the rear end of the lens 1. In the opening of the lens mount there is provided an automatic diaphragm interlocking lever 4 engageable with a diaphragm lever 2. When the levers 2 and 4 are brought into engagement with each other, they can perform an automatic aperture stopping function in the manner known per se. 5 is a quick return mirror for taking up the finder light (hereinafter simply referred to as the mirror). A release button 6 and a mode change-over ring 7 on the top surface of the camera are coaxial. The mode change-over ring 7 has three positions, namely, a position for single frame taking ("S" mode), a position for continuous taking ("C" mode) and a position for locking the release button ("OFF"). When one does not take a picture for a long time, the "OFF" position is selected. 8 is a display for displaying the number of exposed frames, more concretely the recording head track position at which a recording on the magnetic disk is to be carried out. 9 is a switch-over knob movable between a non-record position (NR) and a record position (REC). When the knob 9 is in the non-record position, a sequence of picture-taking operations are carried out without recording. When the knob is set at the record position, the sequence of picture-taking operations are carried out completely with recording of video signal on the magnetic disk.

10 is a shutter time setting dial and 11 is a strobo shoe having a contact 11a for signal transmission. 12 is an eye-piece.

Figure 2A:
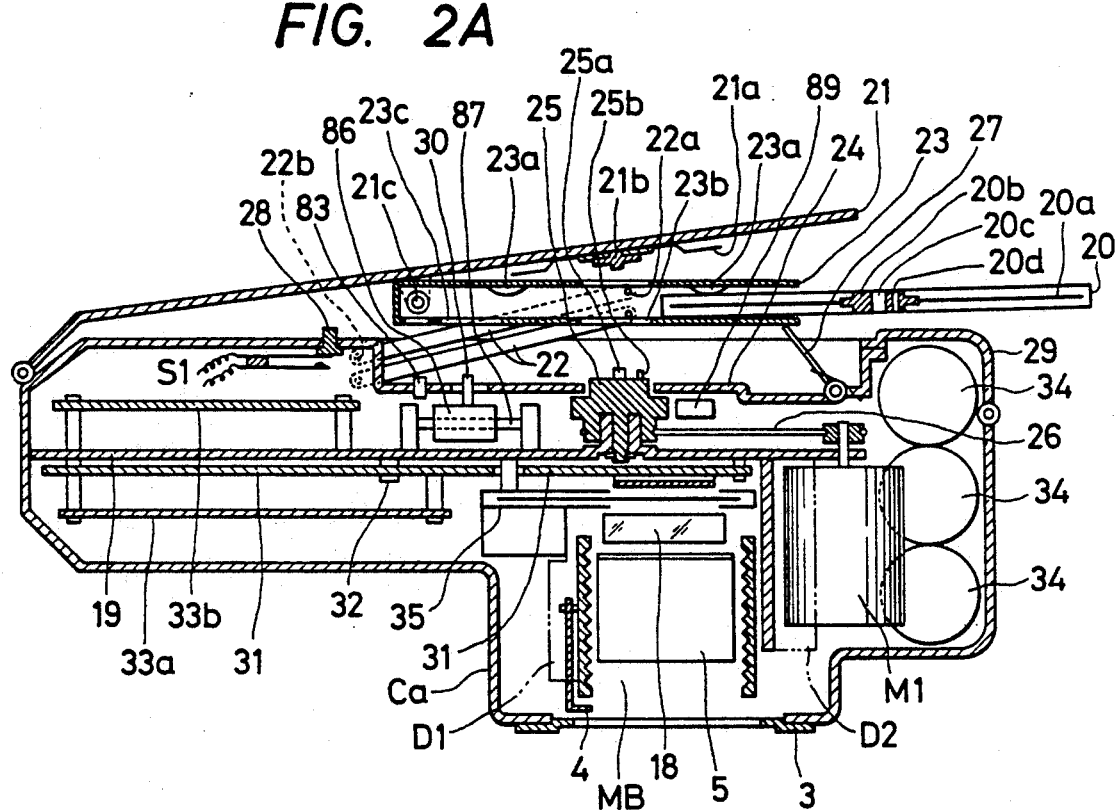
FIG. 2A is a sectional view taken along the line I—I in FIG. 1A.
Figure 2B:
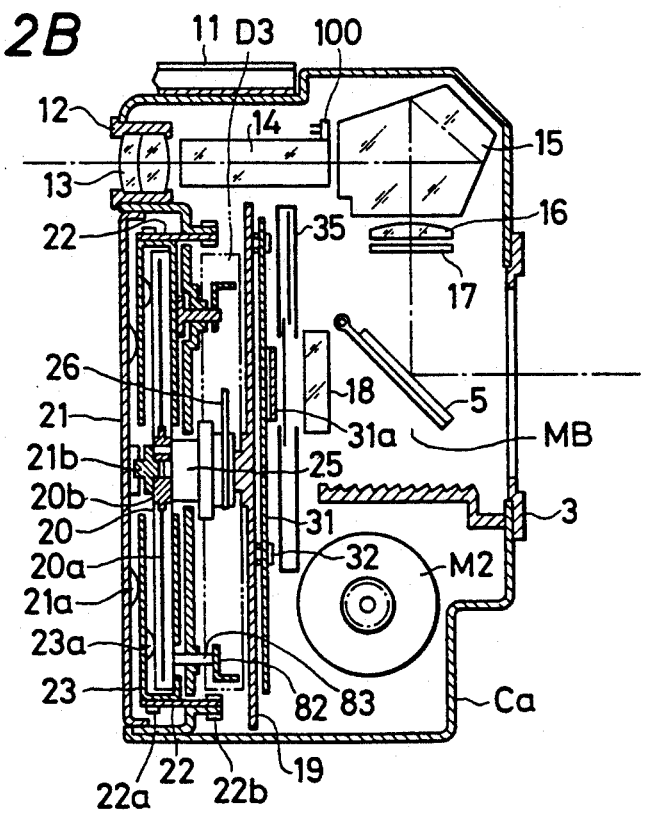
FIG. 2B is a sectional view taken along the line II—II in FIG. 1B.

FIGS. 2A and 2B are sectional views taken along the line I—I and the line II—II in FIGS. 1A and 1B respectively.

In FIGS. 2A and 2B, 20 is a disk cassette containing a magnetic recording disk 20a. FIG. 2A shows the camera in a position in which the disk cassette 20 is being inserted into or removed from the camera body whereas FIG. 2B shows it in a position after loading the cassette 20 in the camera body Ca.

To receive and position the cassette 20 there is provided a cassette holder 23. The cassette holder 23 has, at its one end, an opening through which the cassette 20 can be inserted into the holder. At the opposite end the holder 23 is supported on the back lid 21 of the camera by a pin 21C for pivotal movement about the pin. Further, at the middle the holder is supported by the camera body through pins 22a, links 22 and pins 22b for pivotal movement. Therefore, when the camera back lid 21 is opened as shown in FIG. 2A, the cassette holder 23 is also drawn out from the cassette chamber 24 at the same time. When the back lid 21 is closed as shown in FIG. 2B, the holder 23 is brought into the cassette chamber 24 in the camera body. The cassette holder 23 has a positioning spring 23a disposed on the inside of the holder to position the inserted cassette 20.

For loading a disk cassette 20 one inserts the cassette into the cassette holder 23 in the position as shown in FIG. 2A and then closes the back lid 21. With the closing motion of the back lid 21 the cassette holder 23 with the inserted cassette 20 is moved by the links 22 in the direction parallel to the rotation axis of a disk driving shaft 25 so that an engagement is achieved between the magnetic recording disk 20a within the cassette and the disk driving shaft 25. To this end, the disk driving shaft 25 has a centering pin 25a. The rotation hub 20b at the middle of the disk 20a has a center bore 20c in which the above centering pin 25a can be fitted. Thus, with the closing of the back lid 21, the center bore 20c of the rotation hub 20b is brought into engagement with the center pin 25a of the disk driving shaft 25 through an opening 23b in the holder 23. The disk driving shaft 25 has a driving pin 25b biased by a spring not shown. At the time of the above engagement of the center bore 20c with the center pin 25a, the driving pin 25b is axially pushed by the rotation hub 20b and moved into the shaft 25 against the biasing spring. When a disk driving motor M1 is started to rotate after closing of the camera back lid 21, the rotation of the motor M1 is transmitted to the driving shaft 25 through a belt 26 and therefore the driving pin 25b is also rotated relative to the rotation hub 20b of the disk. The hub has a small hole 20d. When the driving pin 25b is rotated up to the position of the small hole 20d, the driving pin is engaged into the small hole by the biasing force of the above-mentioned spring. After the engagement of the driving pin 25b with the small hole 20d of the rotation hub 20b has been established in this manner, the rotation of the motor M1 can be transmitted to the recording disk 20a.

The camera back lid 21 has a holder pressing spring 21a and a hub pressing block 21b. During the above cassette loading operation, the holder pressing spring 21a serves to position the cassette holder 23. Also, the hub pressing block 21b is brought into engagement with the rotation hub 20b and serves to slightly press the hub against the driving shaft 25.

Designated by 27 is a cover plate which is pivotally supported on the camera body. In the position shown in FIG. 2A, the cover plate 27 is biased clockwise. When the camera back lid 21 is opened and the cassette holder 23 is drawn out from the cassette chamber 24, the cover plate 27 comes into contact with the side wall of the holder 23 under the biasing force. This serves to prevent dust from entering into the cassette chamber 24 from the outside of the camera. When the back lid 21 is closed, the cover plate 27 is pushed by the cassette holder 23 against biasing force and is rotated counter-clockwise.

When the loading of a disk cassette is completed in the manner described above, a magnetic recording head 30 is in contact with the magnetic disk 20a through head insertion openings 23c formed in the cassette holder 23 and also in the cassette 20 itself. Now, the camera is ready for magnetic recording. In recording, the recording head 30 operates in such manner that one picture amount, namely a single frame of video signal, can be recorded just on one circle of the magnetic disk, that is, on one track of the disk 20a.

Unloading of the disk cassette 20 can be done by unlocking a known back lid locking mechanism (not shown) and then opening the back lid 21 to the position as shown in FIG. 2A. In this position, one can easily remove the cassette 20 from the cassette holder 23. A pin 28 in FIG. 2A opens and closes an electric switch S1 in link with the closing and opening motion of the back lid 21. For example, when the back lid 21 is open, the switch is maintained open by the detection pin 28. In this position, the camera does not operate even when one pushes down the release button.

Power supply batteries 34 are received in a battery compartment defined by a cover plate 29. 31 denotes a circuit board on which a solid state image sensor 31a is provided. The circuit board 31 is mounted on a support plate 19 of the camera body for position adjustment by means of set screw 32. Although not shown in the drawing, a color separation filter and an infrared cut-off filter for the compensation of the spectral sensitivity of the sensor are disposed in front of the image sensor 31a. A focal plane shutter 35 is of the known mechanically driven and electronically controlled type. In front of the focal plane shutter 35 there is provided an optical low-pass filter 18 for removing higher spatial frequency components of the image formed through the photographing lens 1. In the prior art arrangement, the color separation filter, infrared cut-off filter and low-pass filter 18 are all arranged directly before the light reception surface of an image sensor 31a. However, the infrared cut-off filter and low-pass filter are relatively thick. Inter-position of these thick optical elements between the light reception surface of the image sensor 31a and the focal plane shutter 35 necessarily makes the distance between the light reception surface and the shutter enlarged. Such a large distance between the light reception surface and the shutter results in reduction of shutter efficiency of the focal plane shutter 35. In the above-shown embodiment of the present invention, therefore, the low-pass filter 18 is disposed directly before the shutter 35 to avoid the reduction of shutter efficiency.

33a and 33b are printed electronic circuit boards used for video signal processing. MB denotes a mirror box in which a quick return mirror 5 is disposed. On the left- and right-hand sides of the mirror box MB as viewed in the drawing FIG. 2A, there are provided driving parts D1 and D2. The driving part D1 includes a mechanism for driving the quick return mirror 5 and the automatic diaphragm setting lever 4. The other driving part D2 includes a mechanism for driving a shutter charge mechanism and a magnetic head moving mechanism.

For image observation through finder, the quick return mirror 5 is in the position shown in FIG. 2B. In this position, the light reflected by the mirror 5 forms an image on a screen 17 which is then guided to an eyepiece 13 through a condenser lens 16 and a pentagonal prism 15. Between the prism 15 and the eyepiece 13 there is a glass block 14 whose function is to lengthen the eye point of the finder.

A second motor M2 is provided at the bottom part of the mirror box MB. The motor M2 serves as the driving power source for the above-mentioned driving parts D1 and D2. D3 is a driving part for rotating the magnetic recording disk.

Figure 3:
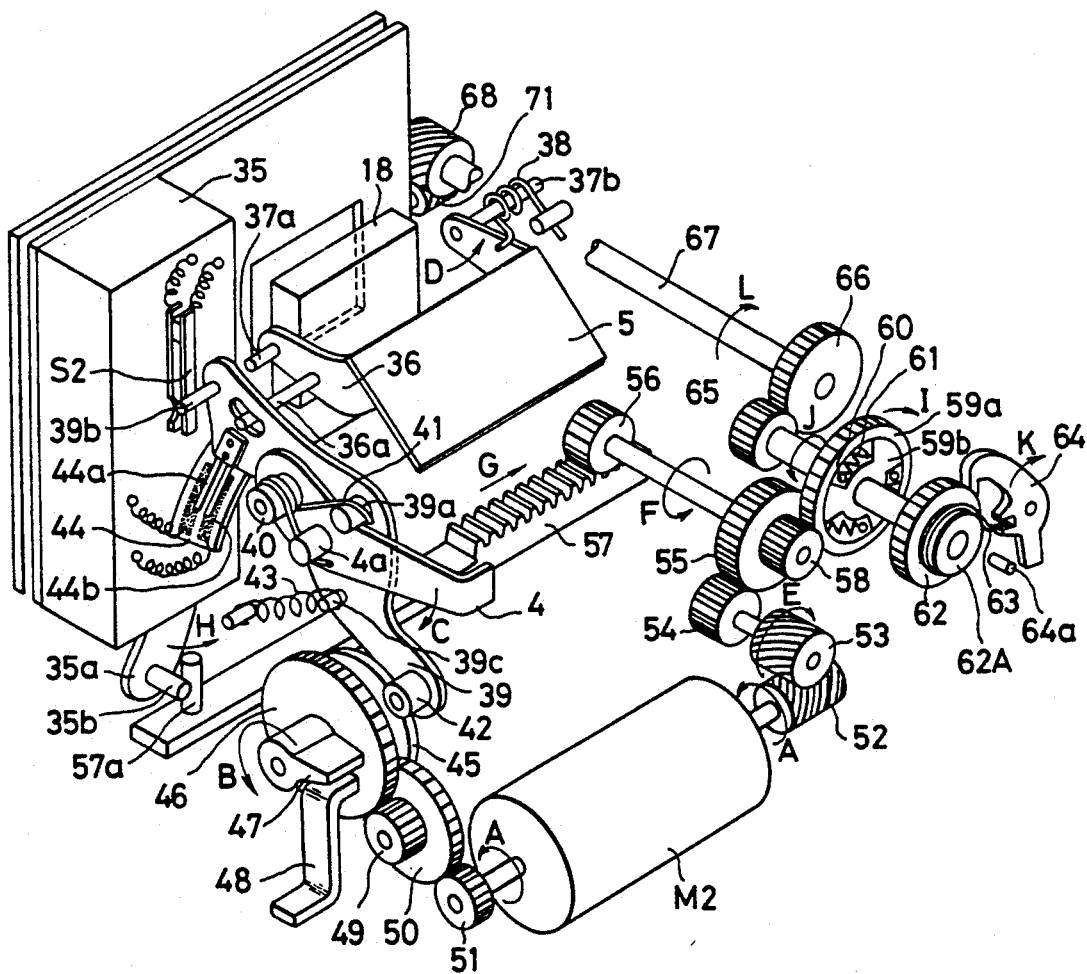
FIG. 3 is a perspective view showing the essential parts of the embodiment.

FIG. 3 is a detailed view of the driving parts for the mirror mechanism, automatic stop setting mechanism, shutter charging mechanism and magnetic head moving mechanism. FIG. 3 shows these mechanisms in the position after the completion of a picture-taking operation and before the start of the next taking operation.

Referring to FIG. 3 the quick return mirror 5 is supported on a mirror holder plate 36 which is in turn supported by pivots 37a and 37b at both sides of the holder 36 for pivotal movement. On the pivot 37b there is disposed a weak spring 38 to hold the attitude of the mirror. The mirror holder 36 has also a stud pin 36a engaged with a mirror driving lever 39. The mirror driving lever 39 and the above-mentioned automatic stop setting lever 4 are rotatably mounted on a common shaft 40. A lever spring 41 is disposed between the two levers 39 and 4 through pins 4a and 39a so that the levers 4 and 39 can be rotated together about the common shaft 40 for normal operation. The lever 39 has a signal pin 39b fixed to one end of the lever to actuate a mirror switch S2 for detecting the start of movement of the mirror 5. On the opposite end of the lever 39 there is provided a roller 42 which can follow a mirror driving cam 45. The mirror driving lever 39 has also a stud pin 39c with a mirror driving spring 43 disposed thereon. Slide brush contacts 44a and 44b constitute a phase detection switch 44. Integrally formed with the mirror driving cam 45 is a gear 46 having a rotation limiting pawl 47 fixed thereto. 48 is a stop cooperating with the limiting pawl 47. By the rotation limiting pawl 47 to the stop 48 the allowable rotational angle of the gear 46 is limited to an angle a little smaller than 360°.

Mirror-up and mirror-down are controlled by the rotational direction of the motor M2. When the motor M2 starts to rotate counter-clockwise (direction of arrow A) from the position shown in FIG. 3, the mirror driving cam 45 is also rotated counter-clockwise (arrow B) through gears 51, 50, 49 and 46. With this rotation of the cam 45, the roller 42 follows the cam 45 under the biasing force of the mirror driving spring 43. Consequently, the mirror driving lever 39 and the automatic stop setting lever 4 are rotated about the common shaft 40 clockwise (arrow C). By this movement of the lever 4, the aperture of the lens 1 is stopped down to a determined stop value. At the same time, the mirror holder 36 is rotated counter-clockwise (arrow D) through the pin 36a to move up the mirror 5 to the position for picture-taking from the position for observation through the finder. With the start of clockwise (arrow C) rotation of the mirror driving lever 39, the pin 39b moves away from the mirror switch S2. Therefore, the switch S2 is turned to the position of OFF from the position of ON, namely the switch is opened. The phase detection switch 44 is turned ON immediately after the start of the clockwise rotation (arrow C) of the lever 39. In the starting position shown in FIG. 3 in which the mirror 5 is in the position for image observation, the phase detection switch 44 is in OFF position. After a further rotation of the motor M2 and immediately before the rotation limiting pawl 47 comes into contact with the stop 48, that is to say, immediately before the the completion of movement of mirror-up to the position for picture-taking, the phase detection switch 44 is again turned to its OFF position from ON position. Therefore, when the pawl 47 comes into contact with the stop 48 and the counter-clockwise rotation (arrow B) of the gear 46 is stopped by it, which means the completion of mirror-up, the phase detection switch 44 has already been in its OFF position.

After the completion of mirror-up operation, the shutter is actuated and an exposure operation is performed After the completion of an operation for recording the video signal on the magnetic disk, the motor M2 starts to rotate clockwise (opposite to arrow A) to rotate the gear 46 and the cam 45 also clockwise. The clockwise rotation of the cam 45 causes the mirror driving lever 39 to rotate counter-clockwise through the roller 42 against the biasing force of the spring 43. Consequently, the mirror holder 36 with the mirror 5 is rotated clockwise. The mirror 5 moves down to the position for image observation. The automatic stop setting lever 4 is rotated counter-clockwise at the same time. By this movement of the lever 4, the aperture of the lens 1 is fully opened again. During this operation for mirror-down, the phase detection switch 44 operates along the opposite course to that for mirror-up. The switch 44 turns to ON from OFF immediately after the start of mirror-down. A short time before the completion of mirror-down, the switch 44 again turns to OFF from ON. On the other hand, the mirror switch S2 which has been turned to OFF from ON by the above mirror-up operation, is again turned to ON from OFF upon the completion of this mirror-down.

As seen from FIG. 3, the output shaft of the motor M2 projects outward on both sides of the motor. On one side, the output shaft has the above-mentioned gear 51 mounted thereon On the opposite side also, the output shaft has a screw gear 52 mounted thereon. The screw gear 52 is in mesh with a second screw gear 53. By these screw gears 52 and 53, the rotation of the motor M2 is converted to a rotation the direction of which is rightangled to that of the motor M2. Further, through a gear train 54, 55, 56 the rotation is converted into a translational motion of a rack 57 which moves linearly and reciprocally. On one end portion the rack member 57 has a stud pin 57a engageable with a shutter charge pin 35b on a lever 35a. The lever 35a is a lever for charging the shutter 35. A shutter charge is effected when the shutter charge pin 35b is pushed by the stud pin 57a. FIG. 3 shows these elements in the position after the completion of shutter charge. The rotation of the gear 53 is transmitted also to a gear 59a through a gear 58 integrally formed with the gear 55. Within the gear 59a there are disposed a cam disk 59b, a roller 60 and a clutch spring 61 which constitute together a known one-way clutch by which only the counter-clockwise rotation of the gear 59a is transmitted to the cam disk 59b. A further gear 62 is fixedly mounted on the shaft on which the cam disk 59b is mounted. The gear 62 has a disk 62A fixed on one side surface of the gear. A friction spring 63 is coiled round the outer circumference of the disk 62A. One end of the friction coil spring 63 is anchored in a cutout of a pawl 64. When the gear 62 is rotated clockwise (arrow I), the coil spring 63 is also rotated in the same direction a little owing to the friction with the disk 62A. The rotation of the spring 63 rotates the pawl 64 counter-clockwise through said one end thereof so that the top end of the pawl 64 can engage in the gear 62 to prevent the rotation of it in this direction. When the gear 62 is rotated counter-clockwise, the coil spring rotates clockwise a little by the friction force so that the pawl 64 is rotated clockwise and disengaged from the gear 62. Therefore the gear 62 is allowed to further rotate counter-clockwise. During this counter-clockwise rotation of the gear 62, the spring 63 does not rotate due to slippage. On the opposite side to the gear 62, the gear shaft has a gear 65 fixedly mounted thereon. The rotation of this gear 65 is transmitted to a screw gear 68 through gear 66 and shaft 67. Because of the presence of the above-described mechanism for allowing gear rotation in one direction and inhibiting gear rotation in the opposite direction, the screw gear 68 can transmit a rotation of a determined rotational angle in the determined direction to the head moving mechanism to drive the latter every picture-taking.

The shutter 35 used in this embodiment is a known focal plane shutter mechanism of the type in which the start of running of the leading curtain at least is triggered by an electric signal. The shutter includes also a trailing curtain running detection switch (not shown). This switch is turned to ON immediately before the completion of the trailing curtain running and turned to OFF during the movement of the trailing curtain from the running end position to the running start position (ready position) by a shutter charging operation. This type of detection switch is known in the art. Hereinafter this trailing curtain running detection switch will be referred to simply as the trailing curtain switch.

When the motor M2 rotates counter-clockwise (arrow A) to move the mirror 5 up starting from the position shown in FIG. 3, the rotation of the gear 51 is transmitted to the system including the gear 50 on one side and at the same time the screw gear 53 is . rotated clockwise (arrow E) by the screw gear 52 on the other side. This clockwise rotation of the screw gear 53 is transmitted to the gear 56 through the gears 54 and 55 as a counter-clockwise rotation (arrow F) to move the rack member 57 in the direction of arrow G. The motor M2 continues to rotate in the direction of arrow A through a rotational angle determined by the above-mentioned pawl 47 and stop 48. With the movement of the rack member 27, the pin 57a on the rack member is also moved up a retracted position in which the shutter charge lever 35a is allowed to rotate in the direction of arrow H. At the time, the gear 59a in mesh with the gear 58 is also rotated in the direction of arrow I (clockwise). However, because of the action of the above-mentioned one-way clutch 59a, 59b, 60, 61, this clockwise rotation can not be transmitted to the gear 65. The clockwise rotation of this gear 59a may slightly be transmitted to the cam disk 59b due to friction. But, the reversal check pawl 64 surely inhibits the cam disk 59b from rotating clockwise.

After the actuation of the shutter 35 and when a picture-taking with recording is completed, the motor M2 is rotated clockwise (opposite to arrow A). By this rotation of the motor M2, the quick return mirror 5 is moved down and also the automatic stop setting mechanism is returned to the starting position in the manner described above. At the same time, the screw gear 53 and the gear 54 are rotated counter-clockwise (opposite to arrow E), and the gears 55, 56, 58 are rotated clockwise (opposite to arrow F). As the gear 56 rotates clockwise, the rack member 57 is moved in the direction opposite to arrow G so that the pin 57a on the rack comes to contact with the pin 35b on the shutter charge lever 35a which has been in the position rotated in the direction of arrow H by the completion of running of the shutter curtain. Therefore, the shutter charge lever 35a is again returned to the starting position shown in FIG. 3 to charge the running force of the shutter.

Also, the clockwise rotation of the motor M2 is transmitted to the gear 59a through gear 58 as a rotation in the direction of arrow J. In case of the rotation in this direction, the clutch mechanism 59a, 59b, 60, 61 can rotate together owing to a wedge effect. Therefore, the shaft 67 rotates in the direction of arrow A (clockwise) to drive the magnetic head moving mechanism. In this manner, the magnetic head is moved a distance corresponding to one frame picture recording track by the head moving mechanism as will be described in detail later only when the motor M2 rotates in the direction for mirror-down.

In the above embodiment shown in FIG. 3, the magnetic head is moved simultaneously with shutter charging at the time of mirror-down after a series of operations of shutter release, image pick-up and recording of video signals on a magnetic disk have been completed. However, as a modification of the embodiment, the moving of the magnetic head may be carried out not during the mirror-down but during the mirror-up. The rotational direction of the motor for mirror-up is opposite to that for mirror-down. Therefore, in such modification, the one-way clutch mechanism 59a, 59b, 60, 61 and the reverse rotation check mechanism 62, 63, 64 must be modified in such manner as to be active to the rotation in the direction opposite to that in FIG. 3. In this case, the rotational direction of the shaft 67 is opposite to arrow L. To drive the head moving mechanism at the time of mirror-up, therefore, it is required to change the helix angle of the screw gear 68 and the screw gear 71 in mesh with it. No further changes in construction and arrangement are necessary to realize such a modification.

Figure 4A:
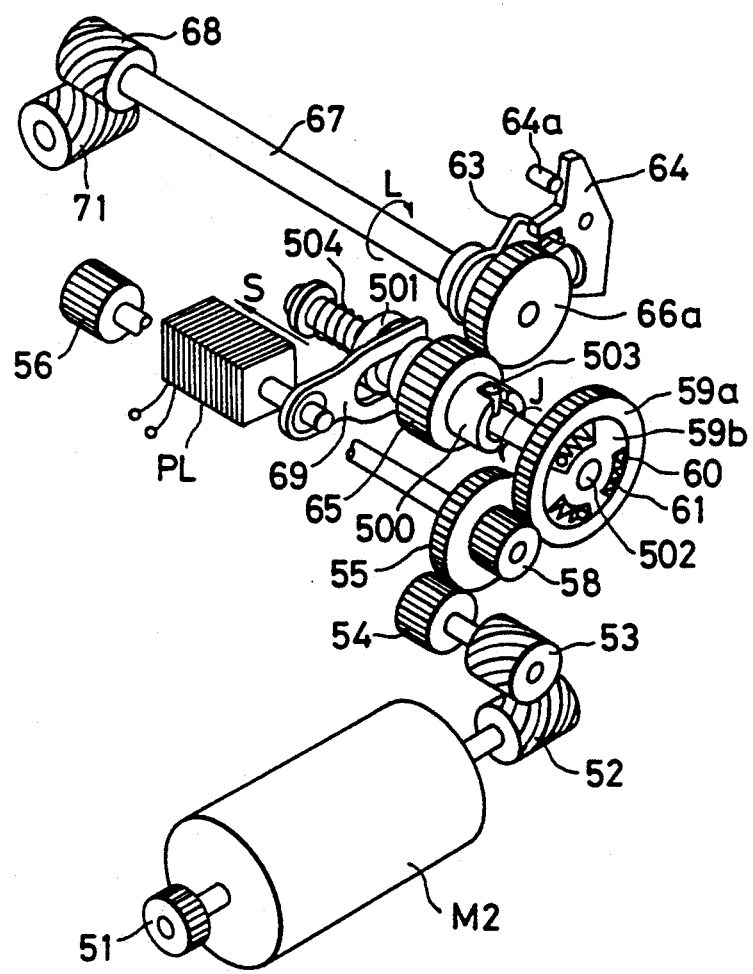
FIG. 4A is a perspective view showing another embodiment of the driving part of the mechanism for moving the recording head as shown in FIG. 3.
Figure 4B:
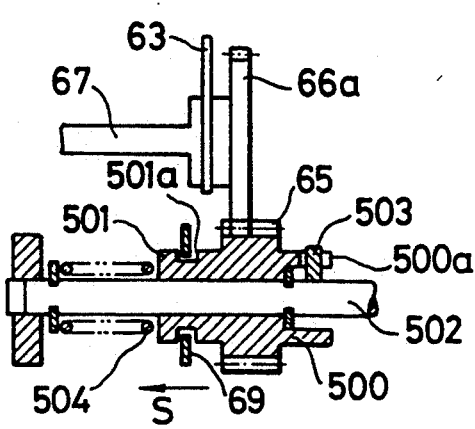
FIG. 4B is a sectional view of an essential portion of the embodiment shown in FIG. 4A.

FIGS. 4A and 4B show another embodiment of the driving part for the head moving mechanism as shown in FIG. 3.

In the embodiment previously shown in FIG. 3, the driving mechanism for moving a magnetic head (58-68) has been so formed as to operate without exception every time when a series of picture-taking operations are completed by the rotation of the motor M2 after releasing the shutter. In contrast, the embodiment shown in FIGS. 4A and 4B is so formed as to enable to stop the operation for moving the recording head if there happens any error in picture-taking and/or recording. When such an error is detected, the head driving part receives a detection signal from the detector externally or internally of the camera body. The recording head is not moved in this case and rerecording on the same track of the magnetic disk is possible.

Referring to FIGS. 4A and 4B, the gear 65 has a sleeve 500 fixed on one side and a sleeve 501 fixed on the other side of the gear. The sleeve 500 has a cutout 500a and the sleeve 501 has a circumferential slot 501a. The cam disk 59b has a shaft 502 fixed thereon. The shaft 502 extends through the gear 65 and the sleeves 500 and 501. The shaft 502 is axially slidable and rotatable relative to the gear and the sleeves. The shaft has a pin 503 fixed thereon which pin is insertable into the cutout 500a. A bias spring 504 is disposed on the shaft 502 to bias the gear 65, sleeves 500 and 501 axially for engagement of pin 503 and cutout 500a. A forked lever 69 is in engagement with the circumferential slot 501a. The lever 69 is driven by a plunger PL in the direction of arrow S.

In the position of the mechanism shown in FIG. 4, the counter-clockwise rotation of the cam disk 59b can be transmitted to the gear 65 through shaft 502, pin 503, cutout 500a and sleeve 500 to rotate the gear 66. When a driving signal is input to the plunger PL, it operates to move the forked lever 69 in the direction of arrow S. As a result, the gear 65 and the sleeves 500, 501 are moved against the bias spring 504 to disengage rotation of the cam disk 59b can no longer be transmitted to the gear 65. The input signal to the plunger PL is applied for a very short time after the motor M2 has started to rotate the gear 59a in the direction of arrow J. Therefore, as soon as the gear 59a and the cam disk 59b have been rotated a determined rotational angle, the cutout 500a and the pin 503 come into engagement again automatically by the biasing force of the spring 504. In this embodiment, the gear 59a and the cam disk 59b rotate 360° per one picture-taking. Therefore, the gear 65 has only one cutout in which the pin 503 engages. In case that the plunger PL is brought into operation to prohibit the advance of the recording head, the input of signal to a later-mentioned counter for counting the number of exposed frames is also stopped, and the number on a display 8 remains unchanged.

Figure 5:
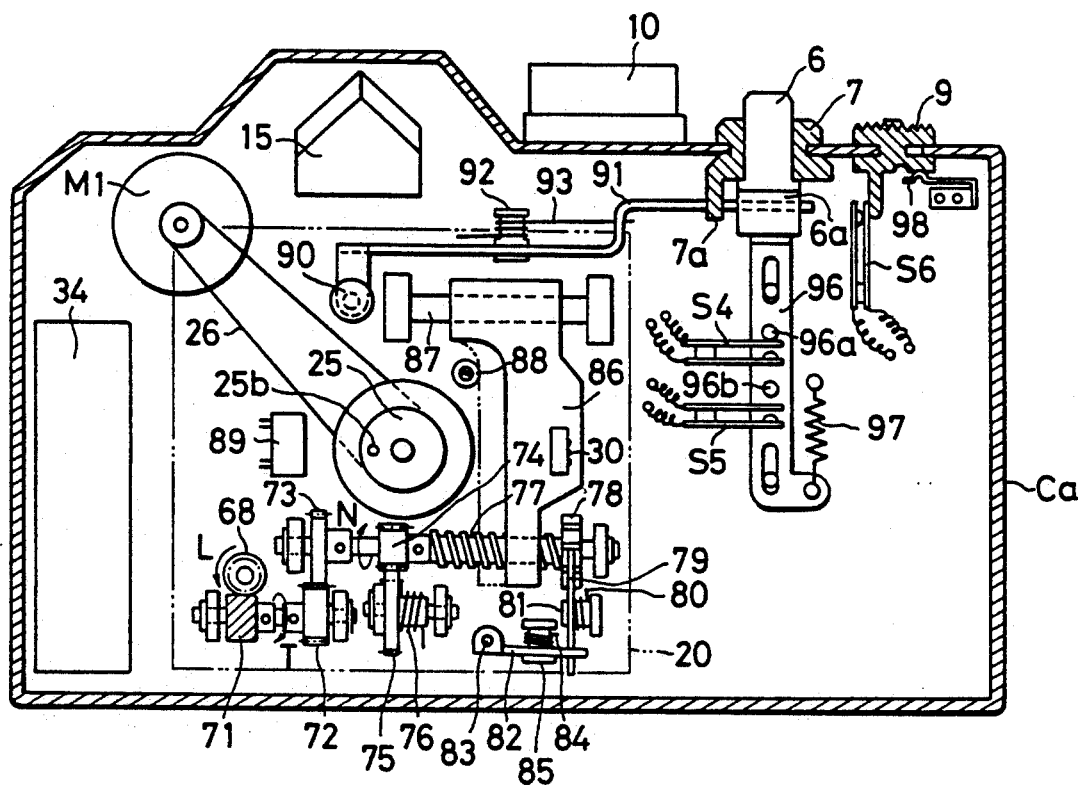
FIG. 5 is a sectional view taken along the line III—III in FIG. 1B.
Figure 6:
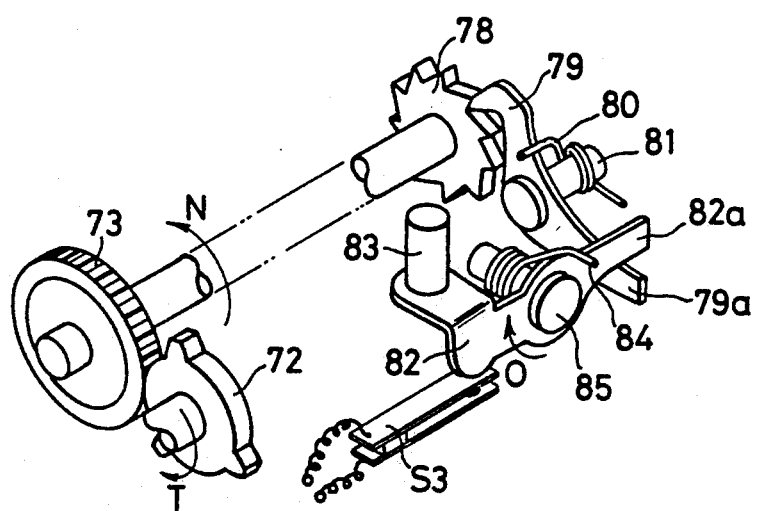
FIG. 6 is a perspective view of an essential portion of the head moving mechanism shown in FIG. 5.

FIG. 5 is a sectional view taken along the line III—III in FIG. 1B and shows the mechanism for moving a recording head. FIG. 6 is a detailed view of a part of the mechanism and FIG. 7 illustrates the operation of gears in the mechanism.

As shown in FIG. 5, the disk rotating motor M1 is located near the side of the pentagonal prism 15 and above the battery 34. This arrangement serves to reduce the size of camera. For such type of recording system in which video signals are recorded concentric-circularly on a disk-like magnetic recording sheet, it is desirable for exchangeability of the system that the magnetic recording disk be rotated at a uniform speed and at a determined rotational frequency (for example, 1,800 rpm or 3600 rpm). The uniformity of rotational speed of the magnetic disk may be disturbed by various factors such as variation of load on the disk driving means (motor), vibration and force externally applied to the apparatus and other external forces. Therefore, in order to improve the uniformity of disk rotation it is essential to reduce the adverse effects by these factors. On the other hand, the ability of high-speed phototaking and the reliability of sequential operation can be improved by employing a motor to directly or indirectly drive the magnetic head advancing mechanism, shutter mechanism, quick return mirror mechanism and automatic stop setting mechanism.

For the reasons mentioned above, according to the present invention, there are provided two separate motors M1 and M2. Of the two motors the first one M1 is used solely to rotate the magnetic disk for which a high level of uniformity of rotational speed and a high-speed response are required. The second motor M2 is used to drive various mechanisms of the camera for which a driving torque is primarily required. The use of two separate motors M1 and M2 brings about another advantage. The members driven by the motor M2 repeat operation and stop in the course of a sequence of taking operations. In contrast, for the magnetic disk driven by the motor M1 it is desired that the disk can be rotated continuously not only during taking but also during operation ready for taking. By doing so, the ability of the camera for snapshotting can further be improved. According to the invention, it is possible to satisfy also this desire because two separate motors M1 and M2 are used.

The disk driving shaft 25 is connected with the motor M1 through a belt 26. To maintain the uniform rotation and serve also as a fly-wheel, the driving shaft 25 is made of such material and in such form which provide large inertial moment. The rotational speed and phase of the disk driving shaft 25 are detected by a sensor 89. The sensor 89 may be formed of a photo coupler composed, for example, of a light-emitting diode and photoelectric transducer element or of a pole element capable of detecting change in a magnetic point. To obtain the speed detection pulse at least one light reflection area or magnetic pole are formed on the circumferential surface of the shaft 25.

As previously shown in FIG. 3, the rotation of the motor M2 is transmitted to the screw gear 71 through counter-clockwise rotation (arrow L) of the screw gear 68. Mounted coaxially to the screw gear 71 is a three-toothed gear 72 whose structure is clearly shown in FIGS. 6 and 7. The gear 72 is in mesh with a gear 73. Three teeth of the gear 72 are arranged at 120° angular intervals. As seen in FIG. 5, the gear 73 is fixed to the shaft of a lead screw 77 together with a gear 74 and a ratchet wheel 78.

A magnetic head 30 is supported on a support plate 86. One end of the support plate 86 is on a guide shaft 87 for parallel movement along the guide shaft. The other end of it is in thread-engagement with the lead screw 77. The head supporting plate 86 is parallel-moved by the rotation of the lead screw 77. The gear 74 is in mesh with a gear 75 having a reset spring 76 thereon. The reset spring 76 has a bias force tending to rotate the lead screw 77 in the opposite direction to arrow N through gears 75 and 74. A ratchet pawl 79 is mounted on a shaft 81 for rotation about it and is biased by an engagement spring 80 to prevent the ratchet wheel 78 from rotating clockwise (opposite to arrow N). An engagement releasing lever 82 is mounted on a shaft 85 for rotation about it, one end 82a of which lever is engageable with the free end 79a of the ratchet pawl 79. The lever 82 is biased by an engagement releasing spring 84 which tends to rotate the lever clockwise (arrow O). The bias force of the engagement releasing spring 84 is larger than the bias force of the engagement spring 80. The engagement releasing lever 82 has a cassette detection pin 83 at the other end. When the camera has a cassette 20 already loaded therein, as shown in FIG. 2B, the cassette detection pin 83 is in contact with the outside part of the cassette 20. Therefore, in this position, the releasing lever 82 can not be rotated clockwise (arrow O) by the spring 84. The forward end 82a of the lever 82 is spaced from the end 79a of the ratchet pawl 79. This allows the ratchet pawl 79 to be rotated counter-clockwise by the biasing force of the spring 80. Thus, as seen in FIG. 6, the pawl 79 is brought into engagement with the ratchet wheel 78 to prevent the latter from being rotated in the direction opposite to arrow N by the force of the reset spring 76.

The manner of operation of the mechanism shown in FIGS. 5 and 6 is as follows:

As previously described, at the time of a selected operation (at the time of mirror-down in case of this embodiment) among a sequence of picture-taking operations of the camera, the screw gear 68 is rotated in a determined direction (arrow L) to rotate the gear 72 in the direction of arrow T a determined rotational angle (120°).

So long as any rotating force is not applied to the gear 72 from the screw gear 68, the position of the gear 72 is solely determined by the position of engagement between ratchet wheel 78 and ratchet pawl 79. In this state, the gear 72 is in the position indicated by ① in FIG. 7A in which the gear 72 is not in mesh with the gear 73. The gear 73 and the ratchet wheel 78 have the same number (herein the number is 10) of teeth. By the actuation of the motor M2 the gear 72 starts to rotate in the direction of arrow T through the screw gear 68. The gear 72 comes into mesh with the gear 73 as indicated by phantom ② in FIG. 7A. The gear 72 further rotates up to a determined rotational angle passing through the position indicated by ③ in FIG. 7B. In this embodiment, the number of teeth of the gears between the motor M2 and the screw gears 68, 71 is so set that the gear 72 can rotate through 120° by one frame exposure operation. Therefore, during a 120° rotation of the gear 73, the gear 72 rotates from the position ① in FIG. 7A to the position ①' in FIG. 7C through the position ④ in FIG. 7C. In this course, the gear 72 gets in the state disengaged from the gear 73 at the position ④. At position ④, the gear 73 is in the position about 45° rotated in the direction of arrow N from the position ①. However, when the gears 72 and 73 become out of mesh at position ④, the gear 73 is rotated by the force of the reset spring 76 in the direction opposite to the arrow N. In other words, the ratchet wheel 78 rotates about 45° in the forward direction and then rotates in the reversed direction until the reversed rotation is stopped by the ratchet pawl 79. In the result, the gear 73 and the ratchet wheel 78 stop at the position ①' rotated by one tooth (36°). By this rotation, one step advance of the head is completed. The gears are again in the position ① ready for the next head advance. As will be understood from the above, the lead screw 77 is driven 1/10 rotation (36°) per exposure and the recording head 30 is advanced a distance corresponding to 1/10 of the lead pitch of the lead screw 77 at every step (if the lead pitch is 1 mm, one step advance of the head is, therefore, 100μ). This distance is the pitch interval of the recording track on the magnetic disk.

When the disk cassette is removed from the camera body, the lever 82 is rotated clockwise by the spring 84. Thereby the forward end 82a of the lever rotates the pawl 79 against the biasing force of the spring 80 to disengage the pawl from the ratchet wheel 78. The head supporting member 86 is returned to its initial position by the force of the reset spring 76. To limit the returning movement of the head supporting member 86 and set the initial position of the member there is provided a stop pin 88 on the supporting base plate 19 of the camera body. The position of the stop pin 88 is adjustable. S3 is a switch ON-OFF of which is controlled by the rear end of the engagement releasing lever 82 (see FIG. 6). When there is no cassette in the camera body, the switch S3 is opened in response to the clockwise rotation (arrow O) of the lever 82 thereby resetting the counter display for the number of exposed frames to 0 (zero). With this arrangement, the magnetic recording head 30 is returned to its initial position and the counter display is also reset to zero by drawing out the cassette from the camera irrespective of the number of exposed frames. In this manner, the recording head 30 automatically returns to its initial position when the cassette 20 is drawn out from the camera body. This assures that for a newly loaded cassette 20 the video signal recording can be carried out starting from the first track among many tracks on the magnetic disk within the cassette without fail. Further, according to the above embodiment, the recording head 30 in any track can easily be returned to its initial position. This is because only one direction rotation of the motor M2 is transmitted to the head advancing mechanism through the one-way clutch 59a, 59b, 60, 61 whereas both of the forward and reverse rotations of the motor M2 are transmitted to the mirror driving mechanism, shutter charging mechanism etc. The provision of a reset spring 76 for biasing the head supporting member toward the initial position serves to eliminate backlash in the head moving mechanism thereby improving the accuracy in advancing the recording head.

The mechanism for release and mode change-over will hereinafter be described with reference to FIGS. 5 and 8.

In FIG. 5, the member designated by 7 is a mode change-over ring and 6 is a release button FIG. 8 is a detailed view showing the relationship between the mode change-over ring 7 and the release button 6.

Referring to FIG. 8, the mode change-over ring 7 has a forked slide brush 94a constituting a mode change-over switch. 95 is a click spring for the ring 7. In FIG. 8 and in FIG. 1B, the mode change-over ring 7 is in the position for single frame exposure mode "S". By turning the ring 7 counter-clockwise from the shown position, the brush 94a slides on a switch substrate 94b to the position for continuous frame exposure mode "C". On the contrary, by turning the ring 7 clockwise from the shown position "S" it can be set to "OFF" position. When the ring 7 is turned to "OFF" from "S", an underside projection 7a of the ring 7 comes into engagement with an arm 91a of a change-over lever 91 and then rotates the lever 91 counter-clockwise about a pivot 92. By the counter-clockwise rotation of the lever, another arm 91b of the lever comes into a cutout 6a at the underside part of the release button 6 to prevent the push-down of the button 6. At the same time, a pin 90 on the change-over lever 91 moves the cassette holder 23 a little from the position shown in FIG. 2B so as to separate the magnetic disk 20a from the recording head 30. Therefore, when the mode change-over ring 7 is in "OFF" position, the release button 6 is locked against push-down. This prevents waste of electric power and failure in picture-taking by any careless push-down of the release button. Also, in this "OFF" position, the magnetic disk 20a in the cassette 20 is kept separated from the magnetic recording head 30. This is of significance in particular when the camera is left alone for a long time with a cassette 20 loaded therein. Since the recording head 30 and the magnetic disk 20a are kept separated from each other in the above embodiment, there occur no problems of sticking by attraction between them and deformation of the magnetic disk, which serves to prevent deterioration of record and failure in recording. The size of the pin 90 by which the cassette holder 23 is pushed is so determined that the cassette 20 is moved only a small distance by it and it has no adverse effect on the cassette detection pin 83, the engagement releasing lever 82 and the switch S3.

93 is a spring which tends to rotate the change-over lever 91 clockwise. To carry out exposure in single exposure mode or in continuous exposure mode, one sets the mode change-over ring 7 to "S" or to "C" (FIG. 1B) and then pushes the release button 6 down. As seen in FIG. 5, with the downward movement of the release button 6 a slide lever 96 also moves down against a spring 97. The slide lever has two pins 96a and 96b fixed thereto At the middle of a predetermined release stroke, the pin 96a at first closes a ready switch S4 and then after a further downward movement of the release button 6 the second pin 96b closes a release switch S5. When the ready switch S4 is closed, an exposure meter circuit of the camera and a display circuit within the camera finder are brought into operation prior to exposure. Also, at the same time, a pre-rotation of the magnetic disk is carried out by the motor M1. A sequence of picture-taking operations of the camera is started when the release switch S5 is closed. Power supply to the motor M2 begins at the time.

S6 is a switch interlocked with the change-over knob 9. The recording circuit from recording head 30 to magnetic disk 20a is rendered inactive by opening the switch S6. 98 is a click spring for the change-over knob 9.

Figure 9:
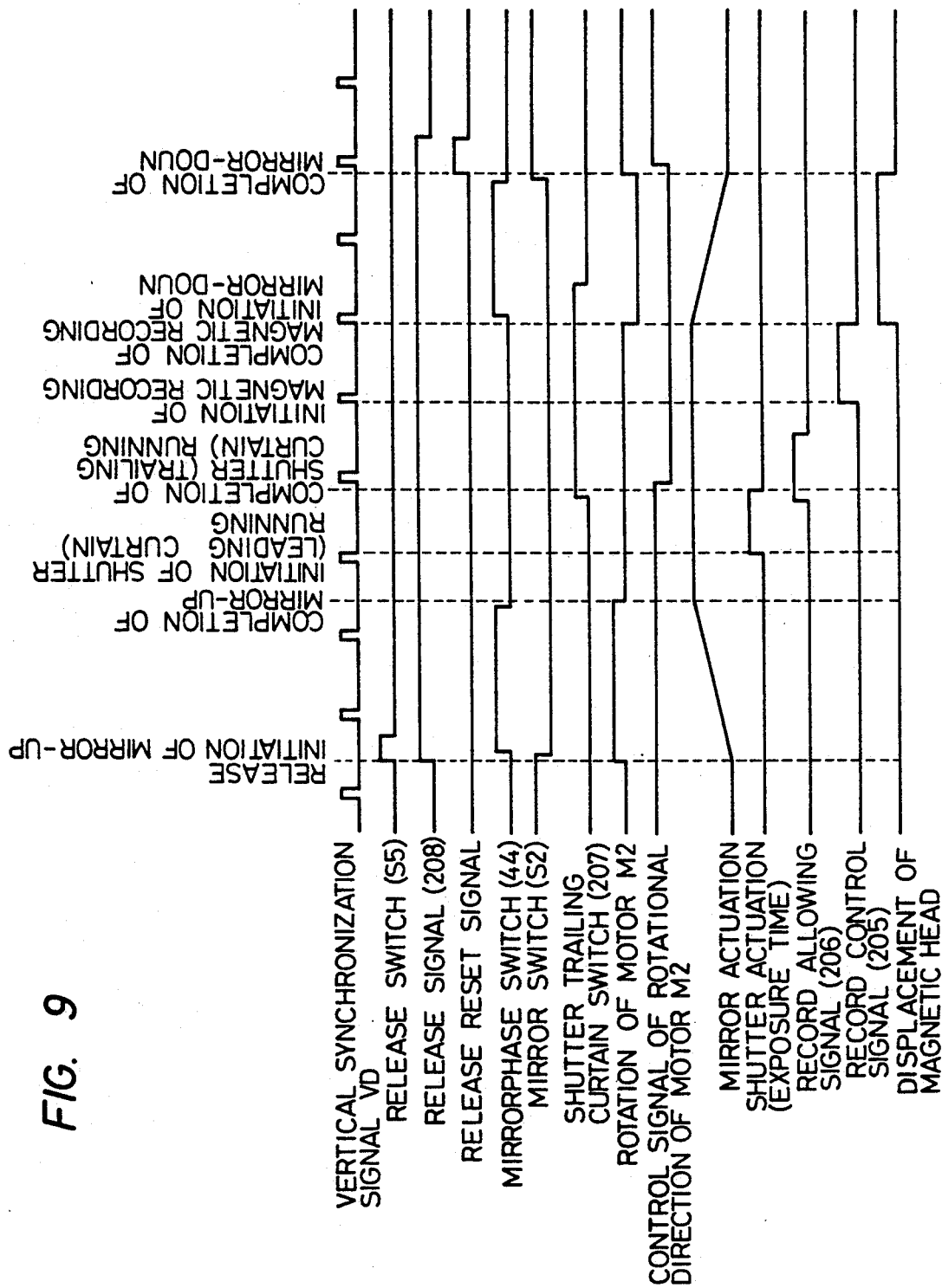
FIG. 9 is a timing chart showing the relationship between the respective operations of the main components and the outputs from the control circuit in the apparatus according to the invention.
Figure 10:
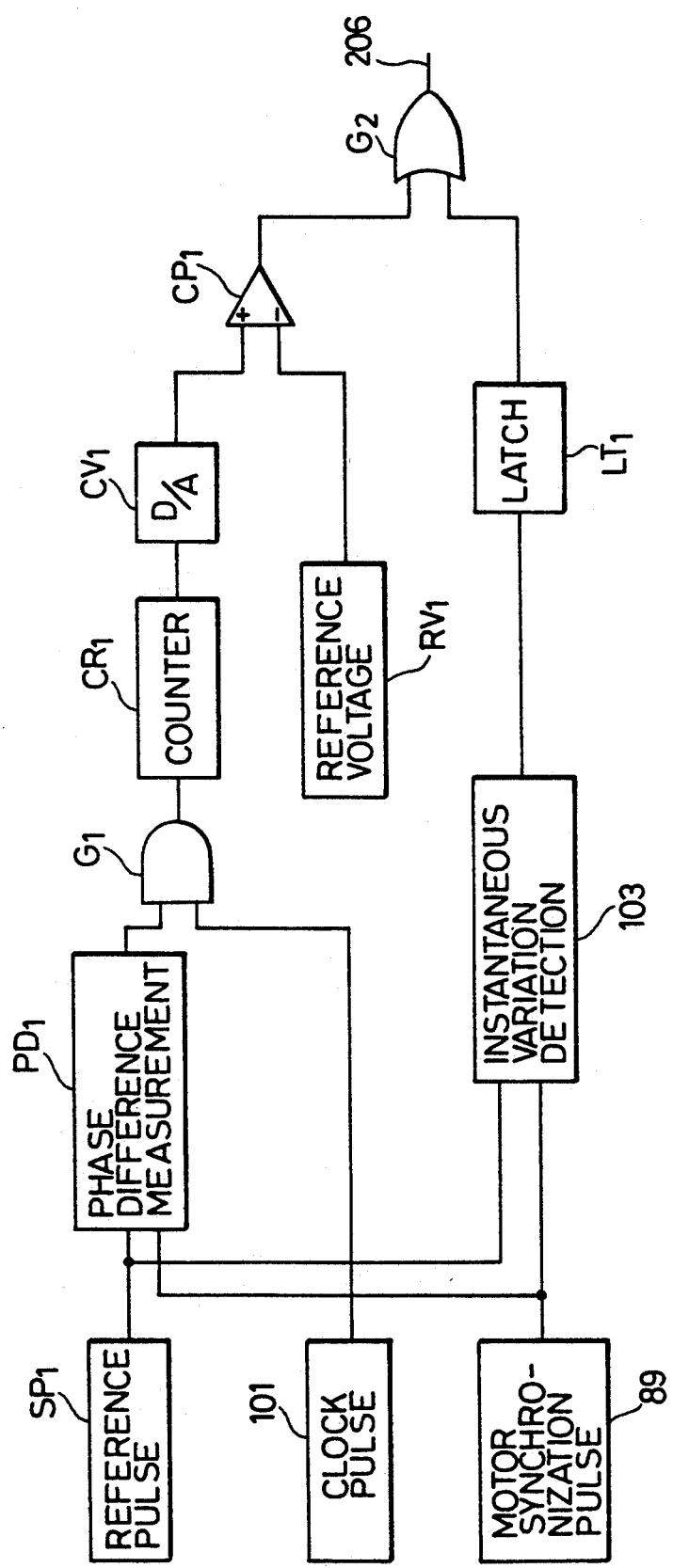
FIG. 10 is a block diagram of a detection circuit for detecting the accuracy of control on the rotational speed of a magnetic disk adoptable in the apparatus according to the invention.
Figure 11:
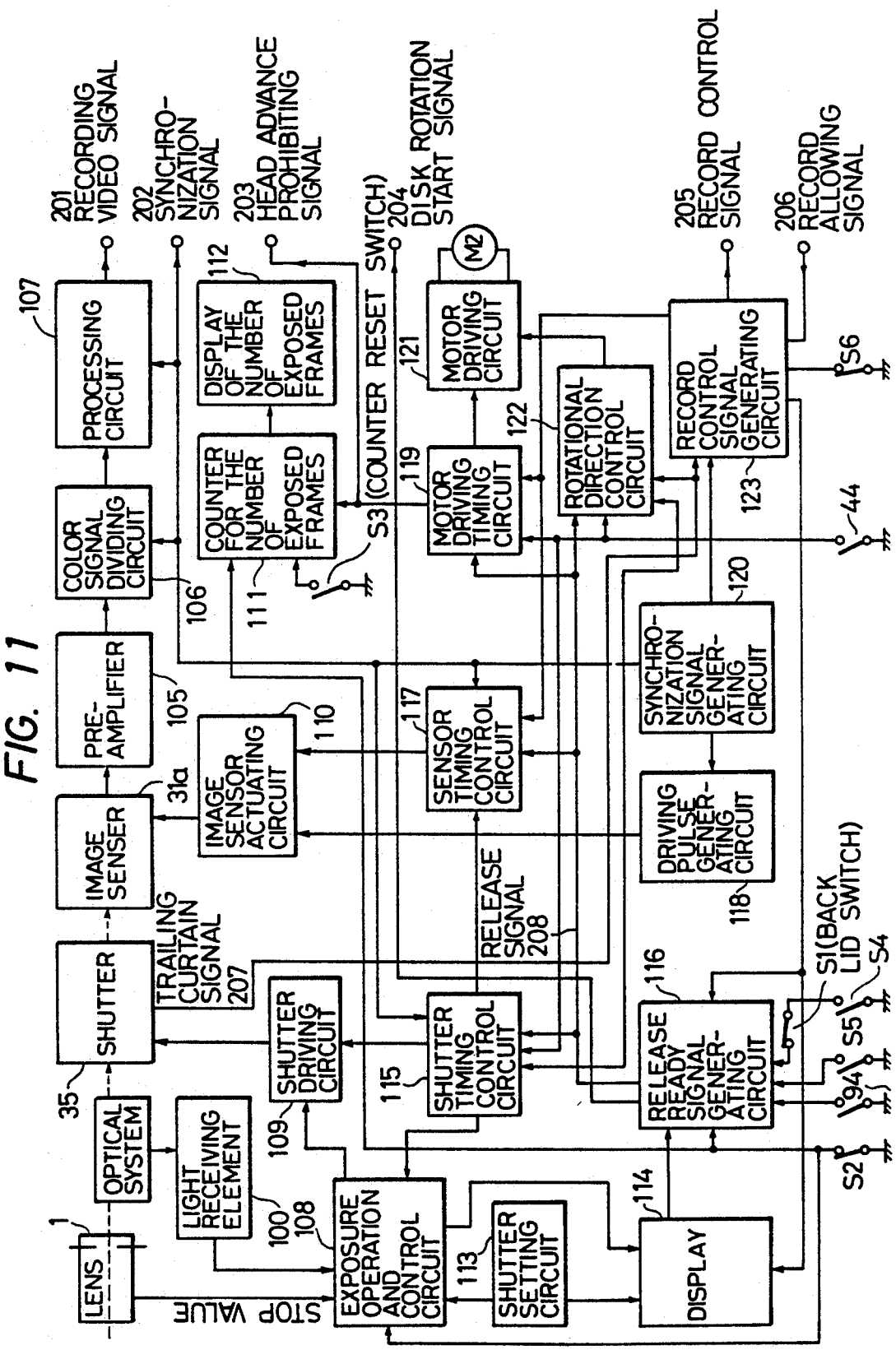
FIG. 11 is a block diagram of an operation sequence control circuit in the apparatus according to the invention.

A sequence control system suitable for the above-shown embodiment will hereinafter be described with reference to FIGS. 9-11 of which FIG. 9 is an operation timing chart of the embodiment, FIG. 10 is a block diagram of a circuit for detecting variation of disk rotation and FIG. 11 is a block diagram of a circuit for the sequence control of the main mechanisms.

As previously mentioned, a stable rotation of magnetic recording disk is essential for recording video signals of still image from an image sensor on the recording track of the magnetic recording disk. This is particularly true for such apparatus in which one field amount or one frame amount of video signal is to be recorded on one turn of track of a magnetic disk rotating at a constant speed as in the case of the apparatus according to the invention. However, variation of disk rotation may occur not only during the period from the actuation of the motor M1 by closing the ready switch S4 to arrival of the magnetic disk at the normal constant speed but also during the period of the rotation at the normal speed even a long time after the reaching of the normal rotational speed. For example, if an exposure is carried out in a running car or in a running train, the magnetic disk and/or the disk driving system may be affected by oscillation. In such a case, therefore, the rotational speed of the disk driven by the motor M1 may vary beyond the allowable limit even in a very short time required to record one frame video signal. The detection circuit shown in FIG. 10 detects variation in rotational speed of the disk rotating motor M1 and, if the detected variation is within allowable range, it generates a record allowing signal.

Referring to FIG. 10, a motor synchronization pulse generating circuit 89 generates a pulse signal synchronized with the rotation of the motor M1. A reference pulse generating circuit SP1 generates a reference pulse having the same frequency as the frequency which the above pulse signal has when the rotational speed of the motor M1 reaches the normal constant speed. A phase difference measurement circuit PD1 measures the phase difference between the output pulse from the circuit 89 and the output pulse from the circuit 120 and generates a pulse output having a pulse width corresponding to the measured phase difference. A clock pulse generator 101 generates a clock pulse of sufficiently high frequency. An AND gate G1 outputs clock pulses the number of which corresponds to the above-mentioned phase difference. A counter CR1 counts the output pulses from AND gate G1 during the generation of video signals of one field. Therefore, the count value of the counter CR1 is small so long as the motor M1 rotates at the normal constant speed but the value becomes larger with larger variation of the rotational speed. A digital/analog converter CV1 converts the content of the counter into an analog voltage. A comparator CP1 compares the analog voltage with a reference voltage from a reference voltage generator RV1. When the speed variation is within a determined allowable range, the comparator generates a L (low) level output. If the variation is out of the allowable range, then the comparator generates a H (high) level output. Since the counter CR1 is reset every one field period, the comparator CP1 renews the output every one field.

In a portable camera it is not unusual that some instantaneous impact is applied to the camera and causes some instantaneous variation of the rotational speed of the motor M1. Such instantaneous variation has an adverse effect on the video signal recording even when the variation takes place for a very very short time in the course of recording of one field of video signals. To detect such an instantaneous variation the detection apparatus shown in FIG. 10 includes an instantaneous variation detection circuit 103. The concrete construction of this circuit 103 is substantially the same as that of the above-described detection circuit 89, 101, 120, PD1, G1, CR1, CV1, RV1, CP1, and in this circuit the counter CR1 is reset every output pulse from the motor synchronization pulse generator 89. Thus, the detection circuit 103 generates a L level output when the instantaneous variation of the motor M1 rotational speed is within the permissible range. When it is out of the allowable range, the detection circuit 103 generates an H level output. The output of the circuit 103 is latched by a latch LT1 for a determined time period, for example, one field period. The output from the latch circuit LT1 and the output from the comparator CP1 are introduced to an OR gate G2. When both of the speed variation during one field period and the instantaneous speed variation are within the allowable range, the OR gate G2 generates an L level output as a record allowing signal 206.

The operation sequence in the embodiment of the invention will be described with reference to FIGS. 9 and 11.

To carry out an ordinary taking with recording, one sets the change-over knob 9 to the position "REC" to close the switch S6. With a push-down of the release button 6, at first the ready switch is closed (turn-ON). In response to the turn-ON of S4, a ready signal generator 116 transmits a disk rotation start signal 204 to the magnetic recording system. Thereby the rotation of the disk is started by the motor M1. As previously described, it takes a certain time until the rotation of the disk reaches the normal constant speed required for video signal recording. Therefore, no record allowing signal 206 is applied to a record control signal generating circuit 123 until this time. No release signal 208 is generated from release ready signal generating circuit 116 even when the release button 6 is further pushed down to close the release switch S5 during the period. By closing the switch S5 after the generation of a record allowing signal 206, a release signal 208 is generated from the release ready signal generator 116.

In response to the generation of release signal 208 a motor driving timing circuit 119 sends an instruction to a motor driving circuit 121 to rotate the motor M2. At the time a motor rotational direction control circuit 122 is generating a signal for rotating the motor M2 counter-clockwise in accordance with a trailing curtain signal 207 coming from the shutter 35 and the state of mirror phase switch 44. With the rotation of the motor M2, the mirror moves up in the manner previously described, and then the mirror switch S2 is opened and the mirror phase switch 44 is closed.

An exposure operation and control circuit 108 receives a stop value signal from the lens and brightness information from a light receiving element 100 and so on and calculates a proper exposure time. The circuit 108 stores the brightness information in response to the opening of the switch S2. Also, ON/OFF signals of the mirror switch S2 are counted by the counter for the number of exposed frames 111 and the counted number of exposed frames is displayed by a display 112.

The exposure operation and control circuit 108 transmits a proper shutter time to the shutter driving circuit 109. If a shutter time is manually set, the circuit 108 transmits, instead of said proper shutter time, the manually set shutter time to the shutter driving circuit 109 according to the output of a manual shutter setting circuit 113. A display 114 displays the shutter time or the stop value in the finder. At the completion of the mirror-up, the mirror phase switch 44 is turned OFF. In synchronism with this signal, the motor driving timing control circuit 119 stops the motor M2. Now, the apparatus is in the state ready for the actuation of the shutter 35. However, it is required to discharge unnecessary charge from the image sensor 31a and make it prepared for the start of the shutter by this time. This is attained in the following manner.

If the image sensor is composed of a CCD, the unnecessary charge is discharged by controlling the overflow control gate in synchronism with the vertical synchronization signal of the image sensor driving circuit issued immediately after the generation of the release signal. In case that the image sensor 31a is composed of a MOS element, every picture element is reset by generating clock signals of the sensor. These are carried out by the image sensor actuation circuit 110 based on the output signal of a sensor timing control circuit 117. The driving pulse for the image sensor is generated by a driving pulse generating circuit 118 and the synchronization signal which the driving pulse is based on is generated by a synchronization signal generating circuit 120. This discharge of unnecessary charge continues until the time point immediately before the initiation of the shutter opening operation. From the turn-OFF of the mirror phase switch 44 the shutter timing control circuit 115 detects the completion of the discharge of the unnecessary charge and transmits a signal for opening the shutter to the shutter driving circuit 109, the exposure operation and control circuit 108 and the sensor timing control circuit 117 in synchronism with the vertical synchronization signal. The image sensor stops the operation for discharging the unnecessary charge and the shutter starts to open. The exposure operation and control circuit 108 begins to count shutter time from the time point of the reception of the shutter opening signal. The image sensor is now in the state fully exposed. When the count reaches a given value, the circuit 108 sends a trailing curtain start signal to the shutter driving circuit 109. The shutter trailing curtain starts running. At the completion of running of the trailing curtain, a trailing curtain signal 207 is generated as a signal indicating the completion of exposure. The signal is transmitted to the rotational direction control circuit 122 and the record control signal generating circuit 123. In response to the trailing curtain signal 207, the circuit 122 sends to the motor driving circuit 121 a signal for driving the motor M2 clockwise. The circuit 123 generates a record control signal 205 when both of trailing curtain signal 207 and record allowing signal 207 are received by it. In response to the record control signal 205, the sensor driving circuit 110 is actuated through the sensor timing control circuit 117 and video signals are read out from the image sensor. At the same time, the recording system including the recording head 30 is brought into operation.

The video signal is amplified by a preamplifier 105 and then divided into red (R), green (G) and blue (B) color signals by a color signal dividing circuit 106. The color signals are introduced into a processing circuit 107 in which necessary signal processings such as black level clamping and shaping are carried out to form a recording video signal 201 which records on the recording disk through the head 30. At the end of record control signal 205 from the signal generator 123, namely at the completion of said recording of the signal 201 on the disk, the motor M2 starts to rotate clockwise in accordance with the output from the driving timing control circuit 119 and the rotational direction signal from the circuit 122. By this clockwise rotation of the motor M2 the operations for mirror-down, shutter charging and magnetic head advance are initiated in the manner previously described. Shock possibly produced by the mirror-down has no effect on recording the video signal on the magnetic disk because the recording has been performed during the period from the shutter closing to the mirror-down start.

With the mirror-down, the mirror phase switch 44 is closed (ON) and immediately before the completion of the mirror-down the switch is opened (OFF) The mirror switch S2 is turned to ON from OFF. In response to this, the driving timing control circuit 119 stops the rotation of the motor M2 and sends a signal to the ready signal generating circuit 116 to reset the release signal 208. As the trailing signal has come to end and also the rotation of the motor has come to end, the rotational direction control circuit 122 is now in the position ready for applying the next signal to the motor driving circuit 121 to drive the motor to counter-clockwise rotation. Thus, the shutter sequence is completed. The apparatus waits for the next release signal.

If there is produced any large variation in the rotational speed of the motor M1 by the shock caused by the above shutter closing operation or by other causes, the record allowing signal 206 is not generated as previously described with reference to FIG. 10. However, when the variation has disappeared within a relatively short time, for example, within several milliseconds, and a record allowing signal was generated, the circuit 123 generates a record control signal 205 to initiate reading of signal charge of the image sensor and recording of it in the same manner as above. The reason for this is that in this case the signal charge in the image sensor is not affected by dark current and S/N ratio is still good. However, if a record allowing signal is generated even after the lapse of the above-mentioned time from the reception of the trailing curtain signal 207, then the signal charge of the image sensor is considered to have been greatly degraded in S/N ratio. Therefore, in this case, the circuit 123 does not generate the record control signal 205. Instead, it prohibits recording of video signal at the time. At the same time, it drives the motor M2 through the motor driving timing circuit 119 to carry out mirror-down and shutter charge. In this case, since no recording was carried out at that time, the driving timing control circuit 119 sends a head advance prohibiting signal 203 to the plunger PL (FIG. 4A) to cut off the transmission of the driving force from the motor M2 to the head advancing shaft 67 while driving the motor M2 for mirror-down and shutter charge. When the head advance prohibiting signal 203 is generated, the circuit 123 gives the display circuit 114 an instruction to make a warning display indicating "not recorded".

When the change-over knob 9 is set to the non-record position "NR" (FIG. 1B) the switch S6 is turned OFF. In this position, following a release operation a series of picture-taking operations are performed without the operation of recording of video signal on the magnetic disk, and the recording head is normally advanced. Therefore, by repeating it the head can be moved up to any desired track without recording on the tracks.

A concrete form of the above-mentioned record control signal generating circuit 123 is shown in FIG. 12.

Referring to FIG. 12, T1 is an input terminal for receiving the low level record allowing signal 206. T2 is an input terminal for receiving the vertical synchronization signal from the signal generating circuit 120. Applied to terminal T3 is the high level trailing curtain signal 207 generated at the completion of running of the shutter trailing curtain. Terminal T4 receives a low level signal when the switch S6 is in the closed position (switch ON)

Assuming that the knob 9 (FIG. 1B) is in the record position "Rec" and a low level signal is now being applied to the input terminal T4, the ready switch S4 is closed to rotate the magnetic disk. Until the rotation reaches a normal constant speed, there is generated no record allowing signal 206 and therefore the potential at the input terminal T1 is at high level. This high level potential is transmitted to the display 114 (FIG. 11) through OR-gate 163 and output terminal T5. Thereby a warning signal indicating exposure unallowable is displayed. The high level potential is introduced also into OR-gate 164. The output level of the gate is rendered low thereby, and the low level output is applied to the release ready signal generating circuit 116 (FIG. 11) to prohibit it from generating the release signal 208.

As soon as the magnetic disk reaches the normal constant rotational speed, there is generated a record allowing signal 206 by which the potential level of the input terminal T1 is rendered low. Therefore, the output levels at the output terminals T5 and T8 are rendered low and high respectively. This stops the above-mentioned warning signal and allows the circuit 116 to generate a release signal. When the release switch S5 is closed thereafter, the circuit 116 generates the release signal 208. Then, the shutter is opened and a determined time after it is closed. So long as the magnetic disk rotates at uniform speed, the generation of record allowing signal 206 continues and the potential at the terminal T1 remains at low level This low level potential is applied to AND gate 151 through inverter 150. On the other hand, as a result of the shutter closing, a high level trailing curtain signal is applied to the input terminal T3. Therefore, the output level of the AND gate 151 is rendered high. In this state, since the potential level at the terminal T3 was low before the generation of the trailing curtain signal, a binary flip-flop 157 is in the reset position and its $\overline{Q}$ output is at high level which opens AND gate 152. Therefore, the vertical synchronization signal applied to the input terminal T2 is transmitted to the clock input terminal of D type flip-flop 155 through AND gates 153 and 152. This flip-flop 155 larches the change to High of the output of AND gate 151 by sampling the rising edge of the vertical synchronization signal and its Q output becomes high level. Receiving this high level output, AND gate 154 begins to generate the vertical synchronization signal. The binary flip-flop 156 renders the level of Q output high simultaneously with the change to High of Q output of the flip-flop 155. The Q output is rendered low synchronizing with the rising edge of the next vertical synchronization signal and therefore the binary flip-flop 157 changes Q output to high level. Consequently, D type flip-flop 155 is cleared and Q output is rendered low level. In brief, Q output of this flip-flop 155 is at high level during the period from the rising edge of a vertical synchronization signal immediately after the simultaneous generation of trailing curtain signal 207 and record allowing signal 206 to the next rising edge of the vertical synchronization signal. At the time when this high level output disappears, $\overline{Q}$ output of the flip-flop 157 becomes a low level output. Therefore, the flip-flop 155 has no clock input to receive and its Q output remains at low level. Because of this Q output being at low level, flip-flops 156 and 157 also have no clock input to receive. Since Q output of one-shot multivibrator 161 is at low level, the above-mentioned high level output of flip-flop 155 is transmitted to output terminals T6 and T7 through AND gate 166. The signal from the terminal T6 as record control signal 205 operates the recording system. The signal from T7 functions as sensor driving signal to read the image sensor through the sensor timing control circuit 117 (FIG. 11). In this manner, video signals are read out from the image sensor and recorded on the disk during the generation of high level output of the flip-flop 155. In response to the disappearance of this high level output, that is to say, in response to the falling edge of the output of flip-flop 155 (AND gate 166), the one-shot multivibrator 162 generates a high level output for a determined time. As motor driving signal, this high level output is transmitted to the motor driving timing control circuit 119 (FIG. 11) through OR gate 165 and output terminal T9. In this manner, after the completion of video signal recording, the motor M2 is driven to carry out mirror-down and shutter charge.

In case that any unallowably large variation in disk rotational speed is caused for any reason after closing the shutter, the record allowing signal 206 is not generated and the potential at input terminal T1 is at high level. Therefore, the output level of AND gate 151 remains low and there are no record control signal and no sensor driving signal from the output terminals T6 and T7. A ternary counter 158 is released from the cleared state by the input of a trailing curtain signal 207 and counts vertical synchronization signals starting from the time of generation of the trailing curtain signal. When the counter content reaches "3", that is, after the lapse of two vertical synchronization periods, Q output of the ternary counter 158 becomes a high level output in synchronism with the rising edge of the vertical synchronization signal This high level output drives, as a motor driving signal, the motor M2 through OR gate 165 and terminal T9. In this manner, if no record allowing signal 206 is generated during a determined time period after closing the shutter, then mirror-down and shutter charge are carried out at once without execution of recording.

Also, the high level output of the counter 158 is transmitted through output terminal T10 as a head advance prohibiting signal and at the same time it triggers the one-shot multivibrator 161. Thereby the multivibrator 161 sends out a warning signal through terminal T5 for a certain time and closes AND gate 166. Therefore, it prohibits the generation of record control signal 205 and sensor driving signal even if a record allowing signal 206 is generated thereafter. The counter time to be set at the counter 158 is not limited to the above-mentioned two vertical synchronization periods. The counter time may suitably be selected according to the degree of generation of dark current of the image sensor.

When the trailing curtain signal 207 is lost by the shutter charge, the above-mentioned circuits are all cleared.

When the non-record position is set to open the switch S6, a high level signal is applied to the terminal T4 and the output of AND gate 153 remains always at low level, which prohibits the generation of record control signal 205 and sensor driving signal. The output of OR gate 164 is at high level. Therefore, in response to the closing of the release switch S5 (FIG. 11), a release signal 208 is generated at once. The mirror is moved up and the shutter is actuated When a trailing curtain signal 207 is generated, a motor driving signal is generated from the output terminal T9 with a certain delay from the generation of the signal 207 by one-shot multivibrators 159 and 160 which constitute a delay circuit. Thus, the motor is driven to carry out mirror-down and shutter charge.

While the invention has been particularly shown and described with reference to preferred embodiments thereof, it will be understood by those skilled in the art that the foregoing and other changes in form and details can be made therein without departing from the spirit and scope of the invention.

We claim:

1. An electronic still camera for recording a still image of an object on a recording disk, comprising:
    a) an image-forming optical system for forming an image of the object;
    b) image pick-up means for converting said image into an electrical video signal representing image fields;
    c) rotating means for rotating said recording disk;
    d) recording means for recording, on said recording disk being rotated, one field of said electrical video signal corresponding to a still image of said image;
    e) detecting means for detecting that variation in rotational speed of said recording disk is beyond a predetermined rotational speed range and outputting a detection signal; and
    f) preventing means responsive to said detection signal for preventing said recording means from recording said electrical video signal on said recording disk.

2. An electronic still camera according to claim 1, wherein said preventing means includes means for preventing said recording means from recording said electrical video signal on said recording disk irrespective of said detection signal, in response to time elapse from completion of said image-to-signal conversion reaching a predetermined value.

3. An electronic still camera according to claim 1, further comprising means for repeatedly generating a synchronization signal which causes said image pick-up means to convert said image into said electrical video signal at a predetermined period, wherein said recording means records one field of said electrical video signal in response to said synchronization signal when the variation in rotational speed of said recording disk is within said predetermined range.

* * * * *